Oct. 26, 1948.  K. L. BERGVALL ET AL  2,452,219

DEVICE FOR THE JOINING OF TUBES

Filed Nov. 15, 1945

Inventors:-
Knut Lennart Bergvall,
Ernst Erik Dahlberg,
by Pierce & Scheffler,
Attorneys.

Patented Oct. 26, 1948

2,452,219

UNITED STATES PATENT OFFICE 2,452,219

DEVICE FOR THE JOINING OF TUBES

Knut Lennart Bergvall and Ernst Erik Dahlberg, Stockholm, Sweden

Application November 15, 1945, Serial No. 628,862
In Sweden August 10, 1945

5 Claims. (Cl. 285—193)

1

The present invention relates to a device for the joining of tubes, tube parts and armature where no packing of the type tow with linseed oil and the like is necessary in order to obtain a sufficient tightening in the joint. Moreover, an exact length of the joined tubes in a construction is obtained by means of the device according to the invention. By this device the tubes can be joined without pipe tongs which require a very large space for the manipulation and also spoil the surface of tubes which have been ready treated before the assembly.

The essential feature of the invention consists therein that the ends of the tubes to be joined are conically bevelled on the outside and that a sleeve is bevelled on the inside in correspondence with the bevel of the two tube ends so that when the tube ends are inserted into the sleeve tightening is obtained in a certain position between the conical surfaces of the sleeve and of the tubes, and that means are provided which, at the same time as the tubes are moved towards one another, automatically retain the tubes and the sleeve relatively to one another in the tightening position. A hook device can be provided in each end part of the sleeve, which hook device automatically snaps into recesses on the outside of the tubes when the tubes during their movement towards one another reach the tightening position with the sleeve. Moreover, longitudinal slits should be made in each end part of the sleeve, which slits facilitate the snapping-in of the hook devices into the recesses. The tongue-like hook devices thus obtained should be provided with recesses on the inside so that the bending out of the tongues is facilitated. According to the invention the end part of the sleeve provided with hook devices can also have an edge which is bevelled inwardly or be provided with a projection so that a hold for tools is obtained when the tubes are removed from one another. A thickening can also be provided on each tube end, the said thickening being arranged in such a way that the hook devices can be brought to engage the same. For that reason no weakening recesses need be made in the tube as is necessary in usual threaded joints, for example.

Figure 1:
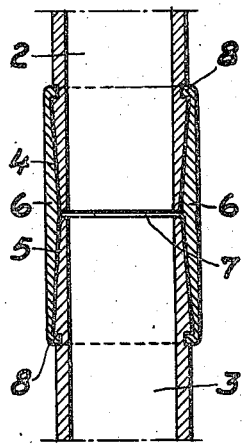
Figure 2:
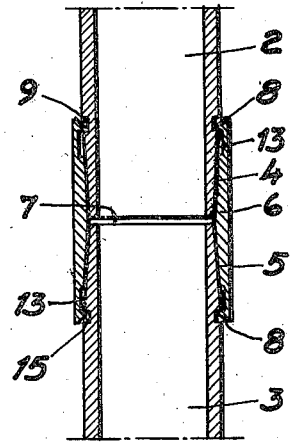
Figure 3:
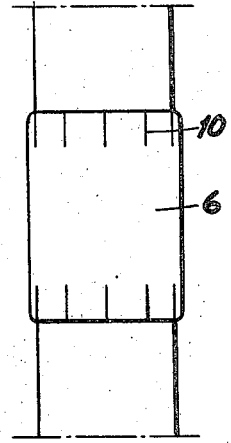
Figure 4:
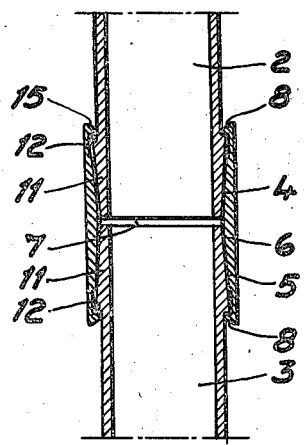
Figure 5:
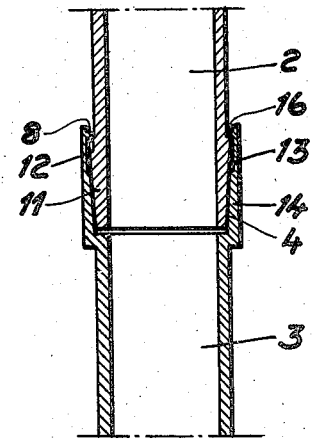

Some embodiments of tube joints according to the invention are shown on the accompanying drawing. Figs. 1 and 2 show a longitudinal section of two embodiments with recesses in the tube ends, and Fig. 3 is a side elevation of these joints. Fig. 4 is a longitudinal section of an embodiment with thickened tube ends, and Fig. 5

2 is a longitudinal section of a modified embodiment.

In the embodiments according to Figs. 1–4 the tubes or tube parts to be joined are designated by 2 and 3. The ends of the said tubes are turned in such a way that conical surfaces 4 and 5 are obtained which converge outwardly. 6 is a sleeve or socket with conical surfaces (see Fig. 1) corresponding to the conical surfaces 4 and 5 in such a way that the conical surfaces will tighten against one another when the tube ends are inserted into the sleeve. In this position there should be a play 7 between the ends of the tubes. The ends of the sleeve are provided with inwardly directed hook devices 8 which snap into recesses 9 or the like arranged in the tubes when the conical surfaces tighten against one another. The ends of the sleeve are provided with longitudinal slits 10 so that the snapping-in of the hook device 8 into the recess is facilitated due to the resilient bending out of the formed tongues. In the embodiments shown in Figs. 2 and 4 suitable recesses 13 are made in the insides of each spring which facilitates the resilient bending out when the tube ends are inserted into the sleeve. In Fig. 4 the tube ends are provided with a thickening 11 which has a sharply marked edge 12 over which the hook devices can be pushed so as to be held in place. In the modified embodiment according to Fig. 5 the tube 3 has a sleeve-formed part 14 which has a conicity corresponding to the conical surface 4 of the other tube 2. Also in this embodiment the sleeve-formed part is provided with the longitudinal slits and recesses 13. The hook devices 8 are also present. In this embodiment each tongue has a projection 16, in order to facilitate the removal of the tubes. For the same purpose an inwardly bevelled surface 15 is shown in Figs. 2 and 4. In order to further increase the tightness of the joint graphite should preferably be used between the tightening surfaces.

Having now described our invention, what we claim as new and desire to secure by Letters Patent is:

1. In a device for coupling rods, pipes and like members in end-to-end relation, a coupling sleeve having divergent internal tapered surfaces for sliding engagement with corresponding external tapered surfaces provided at the ends of said members to be coupled, each end of said sleeve containing a plurality of axially extending slits to form resilient tongues, hook members formed at the outer ends of the tongues, and retaining means provided on the external surface of said coupled members for engagement with said hook members to thereby lock the coupled members together.

2. A coupling device as defined in claim 1 characterized by the fact that said retaining means comprises recesses in the external surface of each of the coupled members into which the hook members snap.

3. A coupling device as defined in claim 1 characterized by the fact that the internal surface of the sleeve beneath the tongues is provided with recesses to facilitate the bending out of the tongues.

4. A coupling device as defined in claim 1 characterized by the fact that the meeting ends of the coupled members are thickened to provide a shoulder for engaging the hook members at each end of the coupling sleeve.

5. A coupling device as defined in claim 1 characterized by the fact that the end faces of the hook members at both ends of the coupling sleeve are bevelled inwardly to provide a hold for receiving a tool to disengage the tongue from its associated retaining means.

KNUT LENNART BERGVALL.
ERNST ERIK DAHLBERG.

REFERENCES CITED

The following references are of record in the file of this patent:

UNITED STATES PATENTS

| Number | Name | Date |
|---|---|---|
| 367,578 | Babb | Aug. 2, 1887 |
| 395,009 | Sharples | Dec. 25, 1888 |
| 442,837 | Ward | Dec. 16, 1890 |
| 937,437 | Halstead et al | Oct. 19, 1909 |
| 1,000,149 | Bristol | Aug. 8, 1911 |
| 2,131,839 | Hall | Oct. 4, 1938 |